United States Patent [19]

Beck et al.

[11] Patent Number: 4,686,271

[45] Date of Patent: Aug. 11, 1987

[54] HYDRAULIC SILICONE CRUMB

[75] Inventors: Earl W. Beck, Dublin, Calif.; Sam A. Brady, Midland, Mich.

[73] Assignee: Dow Corning Corporation, Midland, Mich.

[21] Appl. No.: 835,496

[22] Filed: Mar. 3, 1986

[51] Int. Cl.$^4$ ............................................. C08G 77/06
[52] U.S. Cl. ................................. 528/15; 264/176 R; 264/331.11; 524/781; 524/789; 525/478; 528/31; 528/32
[58] Field of Search ...................... 264/176 R, 331.11; 528/15, 31, 32; 525/478; 524/781, 789

[56] References Cited

U.S. PATENT DOCUMENTS 3,843,601 10/1974 Bruner .................................. 528/24
4,528,156 7/1985 Fukuda et al. ........................ 528/15

OTHER PUBLICATIONS

"Materials News from Dow Corning"/Nov.-Dec. 1969, New Shock-Absorbing Bumper Turns 30-mph Crash into 5-mph Bump, p. 3.

Primary Examiner—Melvyn I. Marquis
Attorney, Agent, or Firm—Roger H. Borrousch

[57] ABSTRACT

A silicone crumb in a fine particulate form has an extrusion rate of at least 50 grams per minute through an orifice of 0.5 inch diameter under a pressure of 345 kilopascals and compression points of less than 1035 kilopascals. This crumb is made from a vinyl-containing polyorganosiloxane, a silicon-bonded hydrogen containing polysiloxane, and a platinum catalyst. The crumb is useful in hydraulic applications.

40 Claims, No Drawings

HYDRAULIC SILICONE CRUMB

BACKGROUND OF THE INVENTION

1. Field of the Invention

This invention relates to a silicone crumb which is useful as a hydraulic material.

2. Background Information

Materials used in hydraulic systems were mainly fluid, i.e. gases or liquids. Such systems are used in machines to move parts of the equipment, for example in a hoist to lift automobiles. Other systems using hydraulics are the brakes on vehicles. The use of solid materials for hydraulic purposes is much more limited because most solids do not readily move and transfer pressure as conveniently as gases and liquids. Silicone fluids are used in hydraulic systems but these systems must be closed systems in the same manner as other hydraulic systems using gases or liquids. If the systems using gases or liquids are not closed, loss of material will occur and the effectiveness of the hydraulics is lost.

Other disadvantages of liquids is that if a leak should occur, it may cause undesirable environmental conditions and the cleanup may be difficult. Some liquids may be unstable under high temperature conditions and solidify or deteriorate such that the hydraulic system is ineffective for its purpose.

Solid materials which can be deformed might be suggested as useful material for hydraulic purposes and for use in methods for thermal expansion molding for composites. These thermal expansion molding methods use solid elastomeric materials in molds to cause pressure against a composite during the molding process. Such thermal expansion molding methods have the disadvantage that the determination of the pressure against the composite is difficult and requires very careful filling of the elastomeric mold portion because either under or over filling can cause unwanted pressures which result in bad composites. Because of the difficulty of using solid elastomeric materials in the thermal expansion molding methods, the expense is high enough to cause these methods to be used only in very special applications in which the expense would be acceptable. However, not much is reported for use of solid materials for hydraulic purposes because the solid materials do not flow.

Bruner in U.S. Pat. No. 3,843,601, issued Oct. 22, 1974, describes a hydraulic elastomer which is reported to have a high cross-link density and a high proportion of free chain ends. Bruner crumbles his elastomer under high shear stress to a powder which flows like a viscous fluid through a narrow orifice. Bruner reports that silicone elastomers are desirable materials for their high thermal stability, have high compressibility, and can be forced through an orifice. However, the silicone elastomers do not easily flow back into their original position because they are relatively hard. Oil has been used to plasticize the elastomer but this results in oil bleed which leaks out of the system. Bruner teaches that an improved hydraulic elastomer can be obtained by curing a linear vinyl containing siloxane copolymer which is made up of dimethylsiloxane units and methylvinylsiloxane units and which has a molecular weight between 20,000 and 200,000 corresponding to viscosities between 1000 and 1,000,000 centipoise at 25° C. The vinyl is present in Bruner's copolymer in an amount of from 0.1 to 0.9 mole percent. Bruner teaches that even with the optimum vinyl content it is found that the ultimate properties of the cured elastomers are not as good as when the viscosity of the fluid is at least 5000 cp and that good physical properties are obtained when the viscosity of the fluid reaches 1,000,000 cp. Bruner cures his vinyl containing copolymer with peroxide. Bruner teaches that those cured elastomers of his which have durometers on the Shore A scale of 8, 10, 19, 22, and 26 are outside the acceptable range of hardness which means that the acceptable hardness are those which have durometers on the Shore A scale between 11 and 18.

SUMMARY OF THE INVENTION

An object of the present invention is to provide a silicone crumb which is easily compressed, extrudes well, provides a consistent pressure, controls the pressure to a predetermined value, readily flows like a liquid, does not agglomerate, and can be repeatedly recycled between crumb and clear liquid appearing material.

This invention relates to a silicone crumb comprising the cured product obtained by curing a mixture of (A) a vinyl-containing polyorganosiloxane consisting essentially of units selected from the group consisting of diorganosiloxane units, monoorganosilsesquioxane units, and triorganosiloxy units in which the organic radicals are monovalent hydrocarbon radicals or monovalent halogenated hydrocarbon radicals, in the polyorganosiloxane the organic radicals being such that at least 0.1 weight percent of them are vinyl radicals, (B) a siliconbonded hydrogen containing polysiloxane in which there is at least 0.5 weight percent silicon-bonded hydrogen atoms, the valences of the silicon atoms not being satisfied by divalent oxygen atoms or silicon-bonded hydrogen atoms are satisfied by monovalent hydrocarbon radicals or monovalent halogenated hydrocarbon radicals, (C) a platinum catalyst for the hydrosilation reaction of (A) and (B), the cured product being in a fine particulate form which exhibits an extrusion rate of at least 50 grams per minute through an orifice of 0.5 inch diameter under a pressure of 345 kilopascals and compression points of less than 1035 kilopascals for the first two compressions.

DESCRIPTION OF THE PREFERRED EMBODIMENTS

The silicone crumb of the present invention is made by curing a composition comprising a vinyl-containing polyorganosiloxane, a silicon-bonded hydrogen-containing polysiloxane, and a platinum catalyst.

The vinyl-containing polyorganosiloxane of (A) are those which are made up of repeating units of diorganosiloxane units, monoorganosilsesquioxane units, and triorganosiloxy units. Other siloxane units can also be present in small amounts if the resulting properties can be obtained, for example $SiO_2$ units. The organic radicals of the polyorganosiloxane can be monovalent hydrocarbon radicals such as methyl, ethyl, propyl, isopropyl, butyl, octyl, phenyl, vinyl, allyl, and cyclohexyl, or monovalent halogenated hydrocarbon radicals such as chloropropyl, 3,3,3-trifluoropropyl, and 2-(perfluorobutyl)ethyl. Preferably, the organic radicals are methyl and vinyl. The polyorganosiloxane of (A) should contain at least 0.1 weight percent vinyl radical based on the total weight of the polyorganosiloxane. The most preferred polyorganosiloxanes of (A) because they provide the best property profile of extrusion rate (flow) and compression points (point at which the crumb changes into a clear solid) are branched polyorganosiloxanes containing a combination of diorganosiloxane units, monoorganosilsesquioxane units, and triorganosiloxy units. Preferably, these branched vinyl-containing polyorganosiloxanes are those described by Brown et al. in U.S. Pat. No. 4,374,967, issued Feb. 22, 1983, which is hereby incorporated by reference to show the preparation of the vinyl-containing polymethylsiloxanes and the polymethylsiloxanes per se. These vinyl-containing polymethylsiloxanes described by Brown et al. consist essentially of 80 to 96.5 mole percent of dimethylsiloxane units, 2 to 10 mole percent of methylsilsesquioxane units, 1.25 to 6.0 mole percent of trimethylsiloxy units, and 0.25 to 4.0 mole percent of vinyldimethylsiloxy units. The branched polyorganosiloxane of (A) preferably have a viscosity at 25° C. of less than 5 pascal-seconds.

Another preferred vinyl-containing polyorganosiloxane is a linear triorganosiloxy endblocked polymethylvinylsiloxane having a viscosity at 25° C. of less than 50 pascal-seconds. The most preferred are those which have trimethylsiloxy endblocking.

The silicon-bonded hydrogen-containing polysiloxane of (B) contains at least 0.5 weight percent hydrogen atom and the radicals bonded to the silicon atoms other than hydrogen atoms and divalent oxygen atoms are monovalent hydrocarbon radical or halogenated hydrocarbon radicals which are illustrated above for the polyorganosiloxane of (A). Preferably, the organic radicals are methyl. The preferred polysiloxanes of (B) are the trimethylsiloxy endblocked polymethylhydrogensiloxanes and those most preferred have 1.4 to 1.6 weight percent silicon-bonded hydrogen atoms.

The platinum catalyst (C) is a catalyst for the hydrosilation reaction between the vinyl radicals on the polyorganosiloxane of (A) and the SiH on the polysiloxane of (B). The platinum catalysts are well known in the art and can be selected from any of them, but the catalyst should be one which is compatible in the mixture of (A) and (B) for even distribution and even cure. The platinum catalysts include chloroplatinic acid and its hexahydrate as described in U.S. Pat. No. 2,823,218, issued Feb. 11, 1958 to Speier et al, and the reaction products of chloroplatinic acid with vinyl endblocked polysiloxane fluids such as sym-divinyltetramethyldisiloxane as described by Willing in U.S. Pat. No. 3,419,593, issued Dec. 31, 1968. The platinum catalysts described by Willing which are preferred are those which are complexes of a divinylsiloxane. Other platinum catalysts include the alkene complexes described by Ashby in U.S. Pat. No. 3,159,601, issued Dec. 1, 1964, and in U.S. Pat. No. 3,159,662, issued Dec. 1, 1964; the platinum acetylacetonate described by Baney in U.S. Pat. No. 3,723,497, issued Mar. 27, 1973; the platinum alcoholates described by Lamoreaux in U.S. Pat. No. 3,220,972, issued Nov. 30, 1965, and in many more patents which describe other types of platinum catalysts. The foregoing patents describing platinum catalysts are hereby incorporated by reference to show the various type of platinum catalysts. The preferred platinum catalysts are those described by Willing.

The compositions of the present invention may begin to cure immediately when (A), (B), and (C) are mixed. If this curing reaction is too rapid, the curing can begin to take place before the ingredients are fully mixed and the result is an uneven cure. Therefore, certain compositions may desirably contain a platinum catalyst inhibitor which retards the hydrosilation reaction at room temperature. Many platinum catalyst inhibitors are known in the art and include, benzotriazole as described in U.S. Pat. No. 3,192,181, issued June 29, 1965; the acetylenic compounds described in U.S. Pat. No. 3,445,420, issued May 20, 1969; the aromatic heterocyclic nitrogen compounds, pyridazine, pyrazine, quinoline, 2,2'-biquinoline, bipyridine, naphthyridine, quinaldine, dialkyl formamides, thioamides, alkylthioureas, and ethylene thiourea described in U.S. Pat. No. 3,188,299, issued June 8, 1965; the polymethylvinylsiloxane cyclics discussed in U.S. Pat. No. 3,923,705, issued Dec. 2, 1975; and many others. The preferred platinum catalyst inhibitors are the acetylenic compounds. The above patents related to platinum catalyst inhibitors are hereby incorporated by reference to show the various platinum catalyst inhibitors and their use in addition cure compositions (hydrosilation reaction).

The mixtures of the present invention can also contain other ingredients such as fillers. Some fillers may be used in small amounts, such a ground quartz or other nonreinforcing fillers, preferably, less than 5 weight percent. Other ingredients include heat stability additives, pigments or other colorants. However, the additives or the amounts used should not be detrimental to the crumb properties.

The amounts of (B) mixed with 100 parts by weight of (A) should be at least 0.1 part by weight. Preferably, (B) is present in an amount of at least 0.5 part by weight. The preferred amounts of (B) are from 0.5 to 10 parts by weight per 100 parts by weight of (A).

The amounts of (C) mixed with the mixtures of (A) and (B) should be at least one part by weight of platinum element per one million parts by weight of (A) and (B).

The mole ratio of silicon-bonded vinyl to silicon-bonded hydrogen can vary broadly such as from 0.01:1 to 30:1.

The ingredients (A), (B), and (C) are mixed and then cured to give the cured product which makes the crumb. The mixtures can be cured by letting it stand at room temperature or by heating it. After the mixture is cured, it is formed into crumbs by various techniques including crumbing by hand. The compositions of the present invention are not tough materials and can be readily formed into a crumb. Preferably, the cured product is put through a particle sizer, such as a screen to make the crumb particles more consistent in particle size distribution. The crumb of the present invention has an extrusion rate of at least 50 grams per minute, preferably at least 800 grams per minute. This extrusion rate is determined by packing the crumb into a Semco tube with an orifice of 0.5 inch. The crumb is then extruded through the orifice for 10 seconds at a pressure of 345 kilopascals. The extruded crumb is weighed and then multiplied by six to get grams per minutes. The extrusion rate of the crumb shows the ease with which the crumb can be transferred from one location to another such as in a brake system, i.e. the rate of flow. The extrusion rate also relates to the ease with which the crumb can be transported by pneumatic means. The higher the extrusion rates means the more easily the crumb will flow.

The crumb of the present invention also has compression points of less than 1035 kilopascals for the first two compressions. Compression points are determined by placing the crumb in a 10 milliliter syringe and pressing the plunger at the rate of one inch per minute using a tensiometer. The pressure at which the crumb goes from opaque to clear is recorded as the compression point. The pressure is then released and the observance is made as to whether the clear material returns to crumb. Each compression and subsequent release of pressure is a cycle. In addition to the first compression, a crumb may be given four cycles. The compression points relate to the ease with which the crumb can be compressed and once in the compressed state, i.e. the clear, liquid appearing state, the pressure applied at any point in the system is transferred equally throughout the clear compressed state in the same manner as it is with a liquid. The subsequent release of the pressure to observe whether the crumb returns to its original crumb state shows the reusability of the silicone crumb of this invention.

The extrusion points of the crumb of this invention are also determined by placing the crumb in a syringe which has a 1/16 of an inch orifice. The extrusion point is determined by placing the syringe in a compression jig of a tensiometer and compressing at the rate of one inch per minute. The minimum pressure needed to push the crumb through the orifice is the extrusion point. The extrusion point is an indication of the ability of the crumb to leak from openings. The extrusion point also shows that the crumb stays put unless there is force being applied to the crumb and that once the force is removed the crumb will stop moving.

The crumb of the present invention is useful for brake systems and other systems which can use hydraulic materials. The crumb of the present invention can be used to control the pressure to a predetermined value by being a readily flowable material and the pressure can be controlled by adding crumb to increase the pressure and removing crumb from the system to reduce the pressure.

The crumb of the present invention is more reversion resistant under confined conditions at the same temperature and pressure than the peroxide cured hydraulic elastomer powder of Bruner. The crumb is also a safe and non-intrusive, flowable, pressurizable medium and has high, unique expansion characteristics. These properties are important features for a material which is to be used in a closed system, especially for the hydraulic systems.

The following examples are for illustrative purposes and should not be construed as limiting the present invention which is properly delineated in the claims. The "parts" are parts by weight unless otherwise stated. The viscosities were measured at 25° C. unless otherwise specified.

EXAMPLE 1

A mixture of 100 parts vinyl-containing polymethylsiloxane containing 87.95 mole percent dimethylsiloxane units, 5.66 mole percent methylsilsesquioxane units, 5.57 mole percent trimethylsiloxy units, and 0.82 mole percent dimethylvinylsiloxy units, and having a viscosity of about 0.00045 square meters per second ($m^2/s$) 1.0 part of a trimethylsiloxy endblocked polymethylhydrogensiloxane having a silicon-bonded hydrogen content of 1.55 weight percent, 0.25 part of a complex obtained by the reaction of chloroplatinic acid and sym-divinyltetramethyldisiloxane and diluted with a siloxane polymer to give 0.7 weight percent platinum element, and 0.01 part of ethynylcyclohexanol was prepared and cured by heating at 150° C. for 10 minutes. The mixture had a molar ratio of vinyl radical to silicon-bonded hydrogen atom of about 0.7. The cured product had a durometer on the Shore OO scale of 58, a tensile strength at break of 13.8 kilopascals, and an elongation at break of 7%. The weight loss of the cured product was determined by heating it at 150° C. for two hours at 91.2 kilopascals and was 0.96 weight percent. The cured product was extruded through a 40 mesh screen to give a crumb which had particle diameters less than 0.42 mm. The extrusion rate of the crumb was 1020 grams per minute, the extrusion point was 653 kilopascals, and the compression points were 810 kPa, 661 kPa, 677 kPa, and 565 kPa at compressions 1, 2, 3, 4, and 5 respectively.

EXAMPLE 2

A mixture of 100 parts of a polymethylsiloxane as described in Example 1 except that the viscosity was about 0.00115 $m^2/s$, 1.0 part of the polymethylhydrogensiloxane as defined in Example 1, 0.25 part of the platinum complex as defined in Example 1, and 0.01 part of ethynylcyclohexanol was prepared and cured by heating at 150° C. for 10 minutes. The mixture had a molar ratio of vinyl radical to silicon-bonded hydrogen atom of about 0.7. The cured product has a durometer on the Shore OO scale of 55 but was too weak to measure the tensile strength and the elongation. The weight loss determined as described in Example 1 was 0.72 weight percent. The cured product was formed into crumb in the same manner as described in Example 1. The extrusion rate of the crumb was 2483 grams per minute, the extrusion point was 531 kPa, and the compression points were 518 kPa, 420 kPa, 421 kPa, 471 kPa, and 538 kPa at compressions 1, 2, 3, 4, and 5 respectively.

EXAMPLE 3

A mixture of 100 parts of polymethylsiloxane as described in Example 1, 5 parts of the polymethylhydrogensiloxane as defined in Example 1, 0.25 part of the platinum catalyst as defined in Example 1, and 0.01 part of ethynylcyclohexanol was prepared and cured by heating at 150° C. for 10 minutes. The mixture had a molar ratio of vinyl radical to silicon-bonded hydrogen atom of about 0.14. The cured product had a durometer on the Shore OO scale of 42 but it was too weak to measure the tensile strength and the elongation. The weight loss determined as described in Example 1 was 1.51%. The cured product was formed into crumb in the same manner as described in Example 1. The extrusion rate of the crumb was 800 grams per minute, the extrusion point was 511 kPa, and the compression points were 523 kPa, 491 kPa, 518 kPa, 509 kPa, and 503 kPa at compressions 1, 2, 3, 4, and 5 respectively.

EXAMPLE 4

A mixture was prepared as described in Example 3, except the amount of polymethylhydrogensiloxane was 10 parts instead of 5 parts. The mixture had a molar ratio of vinyl radical to silicon-bonded hydrogen atom of about 0.07. The mixture was cured by heating at 150° C. for 10 minutes. The cured product had a durometer on the Shore OO scale of 43 but it was too weak to measure the tensile strength and the elongation. The weight loss determined as described in Example 1 was 3.45%. The cured product was formed into crumb in the same manner as described in Example 1. The extrusion rate of the crumb was 1091 grams per minute, the extrusion point was 717 kPa, and the compression points were 706 kPa, 617 kPa, 648 kPa, 608 kPa, and 645 kPa at compressions 1, 2, 3, 4, and 5 respectively.

EXAMPLE 5

A mixture was prepared as described in Example 2, except the amount of polymethylhydrogensiloxane was 5 parts instead of 1.0 part. The mixture had a molar ratio of vinyl radical to silicon-bonded hydrogen atom of about 0.14. The mixture was cured by heating at 150° C. for 10 minutes. The cured product had a durometer on the Shore OO scale of 58 but it was too weak to measure the tensile strength and the elongation. The weight loss determined as described in Example 1 was 2.06%. The cured product was formed into crumb in the same manner as described in Example 1. The extrusion rate of the crumb was 1702 grams per minute, the extrusion point was 684 kPa, the compression points were 531 kPa, 523 kPa, 486 kPa, 481 kPa, and 490 kPa at compressions 1, 2, 3, 4, and 5 respectively.

EXAMPLE 6

A mixture was prepared as described in Example 2, except the amount of polymethylhydrogensiloxane was 10 parts instead of 1.0 part. The mixture had a molar ratio of vinyl radical to silicon-bonded hydrogen atom of about 0.14. The mixture was cured by heating at 150° C. for 10 minutes. The cured product had a durometer on the Shore OO scale of 55 but it was too weak to measure the tensile strength and the elongation. The weight loss determined as described in Example 1 was 2.32%. The cured product was formed into crumb in the same manner as described in Example 1. The extrusion rate of the crumb was 231 grams per minute, the extrusion point was 831 kPa, and the compression points were 850 kPa, 795 kPa, 787 kPa, 776 kPa, and 774 kPa at compressions 1, 2, 3, 4, and 5 respectively.

EXAMPLE 7

A crumb was prepared by mixing 100 parts of the polymethylsiloxane as described in Example 2, 3 parts of five micron ground quartz, 1 part of the polymethylhydrogensiloxane as described in Example 1, and 0.25 part of the platinum catalyst as described in Example 1. The mixture had a molar ratio of vinyl radical to silicon-bonded hydrogen atom of about 0.7. The mixture was then cured by heating at 150° C. for 10 minutes. The cured product had a durometer on the Shore OO scale of 5 but it was too weak to measure the tensile strength and the elongation. The cured product was formed into crumb in the same manner as described in Example 1. The extrusion rate was 82.5 grams per minute, the extrusion point was 746 kPa, the compression points were 875 kPa, 657 kPa, 685 kPa, 598 kPa, and 658 kPa at compressions 1, 2, 3, 4, and 5 respectively.

EXAMPLE 8

A crumb was prepared by mixing 100 parts of the polymethylsiloxane as described in Example 2, 1 part of copper acetylacetonate, 1 part of the polymethylhydrogensiloxane as described in Example 1, and 0.3 part of the platinum complex as described in Example 1. The mixture had a molar ratio of vinyl radical to silicon-bonded hydrogen atom of about 0.7. The mixture was then cured by heating at 150° C. for 10 minutes. The cured product was formed into crumb in the same manner as described in Example 1. The extrusion rate was 871 grams per minute, the extrusion point was 574 kPa, and the compression points were 403 kPa, 382 kPa, 386 kPa, 363 kPa, and 311 kPa at compressions 1, 2, 3, 4, and 5 respectively.

EXAMPLE 9

A crumb was prepared by mixing 100 parts of a trimethylsiloxy endblocked polymethylvinylsiloxane having a viscosity of 0.035 m²/s, 3.5 parts of the polymethylhydrogensiloxane as described in Example 1, and 0.35 part of the platinum complex as defined in Example 1. The mixture had a molar ratio of vinyl radical to silicon-bonded hydrogen atom of about 26. The mixture was cured by heating at 150° C. for 10 minutes. The cured product was formed into crumb in the same manner as described in Example 1. The extrusion rate was 84 grams per minute, the extrusion point was 496 kPa, and the compression points were 807 kPa, 745 kPa, 724 kPa, 703 kPa, and 655 kPa at compressions 1, 2, 3, 4, and 5 respectively.

COMPARISON EXAMPLE 1

A mixture of 100 parts of a dimethylvinylsiloxy endblocked polydimethylsiloxane having a viscosity of 0.000148 m²/s, 5 parts of the polymethylhydrogensiloxane as described in Example 1, 0.25 of the platinum complex as described in Example 1, and 0.01 part of ethynylcyclohexanol was prepared and cured by heating to 150° C. for 10 minutes. The mixture had a molar ratio of vinyl radical to silicon-bonded hydrogen atom of about 0.4. The cured product had a weight loss determined as described in Example 1 of 0.11%, a durometer on the Shore OO scale of 85, a tensile strength at break of 200 kPa, and an elongation at break of 9%. The cured product was formed into crumb in the same manner as described in Example 1. The crumb had an extrusion rate of 0.7 grams per minute, an extrusion point was 1,930 kPa, and a first compression point which went to 1,977 kPa and then the syringe broke. The extrusion rate was found to be too low and the crumb would not flow properly in the systems. The first compression point was too high indicated by the breakage of the syringe which shows that the pressure needed to convert the crumb to a clear state which would transfer pressure equally throughout the system, would be high and would require expensive system construction to avoid leakage or breakage.

COMPARISON EXAMPLE 2

A mixture of 100 parts of a dimethylvinylsiloxy endblocked polydimethylsiloxane having a viscosity of about 0.45 pascal-seconds (Pa.s), 1.0 part of the polymethylhydrogensiloxane as defined in Example 1, and 0.25 part of the platinum complex as defined in Example 1 was prepared and cured by heating at 150° C. for 10 minutes. The mixture had a molar ratio of vinyl radical to silicon-bonded hydrogen atom of about 1.0. The cured product had a durometer on the Shore A scale of 8, a tensile strength at break of 138 kPa, and an elongation at break of 55%. The cured product was formed into crumb in the same manner as described in Example 1. The crumb had an extrusion rate of 9.1 grams per minute, an extrusion point of 1095 kPa, and compression points of 628 kPa, 608 kPa, 645 kPa, 537 kPa, and 520 kPa at compressions 1, 2, 3, 4, and 5 respectively. This crumb had an extrusion rate which was too low and would be difficult to flow through a system.

COMPARISON EXAMPLE 3

A mixture of 100 parts of a dimethylvinylsiloxy endblocked polydimethylsiloxane having a viscosity of 25 Pa.s, 1.0 part of the polymethylhydrogensiloxane as defined in Example 1, 0.27 part of the platinum complex as described in Example 1, and 0.01 part of ethynylcyclohexanol was prepared and cured by heating at 150° C. for 10 minutes. The mixture had a molar ratio of vinyl radical to silicon-bonded hydrogen atom of about 0.16. The cured product had a durometer on the Shore OO scale of 72, a tensile strength at break of 138 kPa, and an elongation of 28%. The weight loss of the cured product determined as described in Example 1 was 0.96%. The cured product was formed into crumb in the same manner as described in Example 1. The crumb had an extrusion rate of 0.6 grams per minute, an extrusion point of 1570 kPa, and compression points of 1204 kPa, 1112 kPa, 1107 kPa, 1168 kPa, and 1082 kPa at compressions 1, 2, 3, 4, and 5 respectively. This crumb had an extrusion rate which was too low and would be difficult to flow through a system. The compression points for the first two compressions were too high and as a result the system would need to be extra strong to withstand the pressure needed to transmit pressure equally throughout a system.

COMPARISON EXAMPLE 4

A mixture was prepared from 100 parts of a methylphenylvinylsiloxy endblocked polydimethylsiloxane having a viscosity of 0.000056 $m^2/s$, 5 parts of the polymethylhydrogensiloxane as defined in Example 1, 0.25 part of the platinum complex as defined in Example 1, and 0.01 part of ethynylcyclohexanol. The mixture had a molar ratio of vinyl radical to silicon-bonded hydrogen atom of about 0.7. The mixture was cured by heating at 150° C. for 10 minutes. The cured product had a durometer on the Shore OO scale of 84, a tensile strength at break of 14 kPa, and an elongation at break of 0%. The weight loss of the cured product determined as described in Example 1 was 0.02%. The cured product was formed into crumb in the same manner as described in Example 1. The crumb had an extrusion rate of 1.3 grams per minute, an extrusion point of 1598 kPa, and compression points of 1577 kPa, 1512 kPa, 1546 kPa, 1538 kPa, and 1543 kPa at compressions 1, 2, 3, 4, and 5 respectively. This crumb had an extrusion rate which was too low and compression points which were too high and would have the same short comings as the crumb of Comparison Example 4.

COMPARISON EXAMPLE 5

A crumb was prepared in the same manner as described in Comparison Example 4, except that the viscosity of the polydimethylsiloxane was 0.00076 $m^2/s$. The mixture had a molar ratio of vinyl radicals per silicon-bonded hydrogen atom of about 0.6. The cured product had a durometer on the Shore OO scale of 61, a tensile strength at break of 175 kPa, and an elongation at break of 8%. The cured product had a weight loss determined in the same manner as described in Example 1 of 0.1%. The crumb had an extrusion rate of 6.5 grams per minute, an extrusion point of 1744 kPa, and compression points of 2013 kPa, 1757 kPa, 1489 kPa, 1684 kPa, and 1598 kPa at compressions 1, 2, 3, 4, and 5 respectively. The crumb at the third compression changed slowly to the clear state which would be an indication that the transfer of pressure through a system may be difficult. The extrusion rate is too low and the compression points are too high which would have the same short comings as the crumb of Comparison Example 4.

COMPARISON EXAMPLE 6

A mixture of 100 parts of a methylphenylvinylsiloxy endblocked polydiorganosiloxane having 96.5 mole percent dimethylsiloxane units and 3.5 mole percent methylphenylsiloxane units and having a viscosity of 0.0215 $m^2/s$, 1.0 part of the polymethylhydrogensiloxane as defined in Example 1, and 0.25 part of the platinum complex as defined in Example 1 was prepared and cured by heating at 150° C. for 10 minutes. The mixture had a molar ratio of vinyl radical to silicon-bonded hydrogen atom of about 0.7. The cured product had a durometer on the Shore A scale of 11, a tensile strength at break of 159 kPa, and an elongation at break of 53%. The cured product was formed into a crumb in the same manner as described in Example 1. The crumb had an extrusion rate of 2 grams per minute, an extrusion point of 1202 kPa, and compression points of 765 kPa, 777 kPa, 719 kPa, 815 kPa, and 760 kPa at compressions 1, 2, 3, 4, and 5 respectively. The crumb had an extrusion rate which was too low for satisfactory flow in a system.

COMPARISON EXAMPLE 7

Two mixtures were prepared in the same manner as described in Example 7, except the 3 parts of ground quartz was replaced with 3 parts of fumed silica filler in one mixture (Crumb 1) and 3 parts of fumed silica filler treated with trimethylsiloxy units (Crumb 2). The cured product for making Crumb 1 had a durometer on the Shore A scale of 9, but the tensile strength and the elongation could not be measured because it was too weak. The crumb had an extrusion rate of 6 grams per minute, an extrusion point of 771 kPa, and compression points of 720 kPa, 642 kPa, 643 kPa, 662 kPa, and 628 kPa at compressions 1, 2, 3, 4, and 5 respectively. The cured product for making Crumb 2 had a durometer on the Shore A scale of 10, but the tensile strength and the elongation could not be determined because it was too weak. The crumb had an extrusion rate of 18 grams per minute, an extrusion point of 678 kPa, and compression points of 583 kPa, 552 kPa, 605 kPa, 600 kPa, and 569 kPa at compressions 1, 2, 3, 4, and 5 respectively. Both Crumb 1 and Crumb 2 had extrusion rates which were too low for satisfactory flow in a system.

COMPARISON EXAMPLE 8

Three mixtures were made in which each contained 100 parts of a trimethylsiloxy endblocked polydiorganosiloxane having 50 mole percent dimethylsiloxane units and 50 mole percent methylphenylsiloxane units and having a viscosity of 0.035 $m^2/s$, 1, 5, or 10 parts of the polymethylhydrogensiloxane as defined in Example 1, and 0.3 part of the platinum catalyst as defined in Example 1. Crumb 3 was made from the mixture having 1 part of the polymethylhydrogensiloxane and had a molar ratio of vinyl radical to silicon-bonded hydrogen atom of about 11. The cured product was made into a crumb in the same manner as described in Example 1. Crumb 3 had an extrusion rate of 3 grams per minute, an extrusion point of 738 kPa, and compression points of 731 kPa, 614 kPa, 607 kPa, 614 kPa, and 641 kPa at compressions 1, 2, 3, 4, and 5 respectively. Crumb 4 was made from the mixture having 5 parts of polymethylhydrogensiloxane and had a molar ratio of vinyl radical to silicon-bonded hydrogen atom of about 7.6. The cured product was formed into crumb in the same manner as described in Example 1. Crumb 4 had an extrusion rate of 1.5 grams per minute, an extrusion points of 1002 kPa, and compression points of 852 kPa, 719 kPa, 719 kPa, 681 kPa, and 725 kPa at compressions of 1, 2, 3, 4, and 5 respectively. Crumb 5 was made from the mixture having 10 parts of polymethylhydrogensiloxane and had a molar ratio of vinyl radical to silicon-bonded hydrogen atom of about 3.8. The cured product was made into crumb in the same manner as described in Example 1. Crumb 5 had an extrusion rate of 1 gram per minute, an extrusion point of 1685 kPa, and compression points of 2037 kPa and 1569 kPa for compressions 1 and 2 respectively. The syringe broke on compression 3. The extrusion rates for Crumbs 3, 4, and 5 were too low for satisfactory flow in a system and Crumb 5 shows by the breaking of the syringe that it would be extremely difficult to transfer pressure throughout a system equally in the same manner as would occur using a liquid because the syringe broke before the crumb changed to the clear state.

COMPARISON EXAMPLE 9

A mixture was prepared from 100 parts of the vinyl-containing polymethylsiloxane as defined in Example 2, 2 parts of silicon-bonded hydrogen containing polysiloxane of the formula

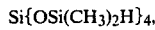

Si{OSi(CH$_3$)$_2$H}$_4$, and 0.5 part of the platinum complex as defined in Example 1. The mixture had a molar ratio of vinyl radical to silicon-bonded hydrogen atom of about 0.46. The amount of the silicon-bonded hydrogen polysiloxane was adjusted to give a minimum cure. The mixture was cured by heating at 150° C. for 10 minutes. The cured product was made into a crumb in the same manner as described in Example 1. The crumb had an extrusion rate of 243 grams per minute, an extrusion point of 721 kPa, and compression points of 1495 kPa, 776 kPa, 660 kPa, and 779 kPa for compressions 1, 2, 3, and 4 respectively. The crumb remained compressed after compression 4 and thus would not be a suitable material in a system which needs repeated compressions such as in a brake system.

COMPARISON EXAMPLE 10

A mixture was prepared from 100 parts of the vinyl-containing polymethylsiloxane as defined in Example 2, 3 parts of a trimethylsiloxy endblocked polysiloxane having 62.5 mole percent methylhydrogensiloxane units and 37.5 dimethylsiloxane units and an average of about 10 siloxane units, and 0.5 part of the platinum complex as defined in Example 1. The mixture had a molar ratio of vinyl radical to silicon-bonded hydrogen atom of about 0.5. The mixture was cured by heating at 150° C. for 10 minutes. The cured product was formed into crumb in the same manner as described in Example 1. The crumb had an extrusion rate of 14 grams per minute, an extrusion point of 567 kPa, and compression points of 1458 kPa, 883 kPa, 598 kPa, 496 kPa, and 446 kPa for compressions 1, 2, 3, 4, and 5 respectively. The crumb remained almost clear after the third compression which would indicate that the crumb would not be a suitable material in a system which needs repeated compressions such as in a brake system. The extrusion rate was also too low and would thus not be a suitable material for use in a system which requires movement of the crumb.

COMPARISON EXAMPLE 11

A mixture was prepared from 100 parts of the vinyl-containing polymethylsiloxane as described in Example 2 and 5 parts of tertiary-butyl peroxy carbonate. The mixture was cured by heating at 150° C. for 10 minutes. The cured product was formed into crumb in the same manner as described in Example 1. The crumb had an extrusion rate of 346 grams per minute, an extrusion point of 377 kPa, and compression points of 793 kPa, 825 kPa, 830 kPa, 828 kPa, and 853 kPa for compressions 1, 2, 3, 4, and 5 respectively. After the third compression, the crumb remained packed and somewhat clear. This feature shows that the crumb would not be a suitable material in a system which needs repeated compressions such as in a brake system.

COMPARISON EXAMPLE 12

Three mixtures were prepared from 100 parts of a vinyl-containing polymethylsiloxane, 3.5 parts of the polymethylhydrogensiloxane as defined in Example 1, and 0.35 part of the platinum complex as defined in Example 1. Crumb 6 was made using a trimethylsiloxy endblocked polydiorganosiloxane having 10 mole percent methylvinylsiloxane units and 90 mole percent dimethylsiloxane units and having a viscosity of 0.035 m$^2$/s. Crumb 7 was made using a trimethylsiloxy endblocked polydiorganosiloxane having 25 mole percent methylvinylsiloxane units and 75 mole percent dimethylsiloxane units and having a viscosity of 0.035 m$^2$/s. Crumb 8 was made using a trimethylsiloxy endblocked polydiorganosiloxane having 50 mole percent methylvinylsiloxane units and 50 mole percent dimethylsiloxane units and having a viscosity of 0.035 m$^2$/s. The crumbs were made by the method described in Example 1. Crumb 6 had an extrusion rate of 1.3 grams per minute, an extrusion point of 621 kPa, and compression points of 689 kPa, 627 kPa, 627 kPa, 586 kPa, and 566 kPa for compressions 1, 2, 3, 4, and 5 respectively. Crumb 7 had an extrusion rate of 2 grams per minute, an extrusion point of 754 kPa, and compression points of 827 kPa, 752 kPa, 669 kPa, 752 kPa, and 669 kPa for compressions 1, 2, 3, 4, and 5 respectively. Crumb 8 had an extrusion rate of 3 grams per minute, an extrusion point of 738 kPa, and compression points of 731 kPa, 614 kPa, 607 kPa, 614 kPa, and 641 kPa for compressions 1, 2, 3, 4, and 5 respectively. Each of these crumbs had an extrusion rate which was too low for transporting material throughout a system.

That which is claimed is:

1. A silicone crumb comprising the cured product obtained by curing a mixture of
   (A) a vinyl-containing polyorganosiloxane consisting essentially of units selected from the group consisting of diorganosiloxane units, monoorganosilsesquioxane units, and triorganosiloxy units in which the organic radicals are monovalent hydrocarbon radicals or monovalent halogenated hydrocarbon radicals, in the polyorganosiloxane the organic radicals being such that at least 0.1 weight percent of them are vinyl radicals,
   (B) a silicon-bonded hydrogen containing polysiloxane in which there is at least 0.5 weight percent silicon-bonded hydrogen atoms, the valences of the silicon atoms not being satisfied by divalent oxygen atoms or silicon-bonded hydrogen atoms are satisfied by monovalent hydrocarbon radicals or monovalent halogenated hydrocarbon radicals, (C) a platinum catalyst for the hydrosilation reaction of (A) and (B), the cured product being in a fine particulate form which exhibits an extrusion rate of at least 50 grams per minute through an orifice of 0.5 inch diameter under a pressure of 345 kilopascals and compression points of less than 1035 kilopascals for the first two compressions.

2. The silicone crumb in accordance with claim 1 in which the vinyl-containing polyorganosiloxane of (A) is made up of a combination of diorganosiloxane units, monoorganosilsesquioxane units, and triorganosiloxy units.

3. The silicone crumb in accordance with claim 2 in which the organic radicals are methyl and vinyl.

4. The silicone crumb in accordance with claim 3 in which the diorganosiloxane units are dimethylsiloxane units, the monoorganosilsesquioxane units are methylsilsesquioxane units, and the triorganosiloxy units are trimethylsiloxy units and dimethylvinylsiloxy units.

5. The silicone crumb in accordance with claim 4 in which the vinyl-containing polyorganosiloxane has a viscosity at 25° C. of less than 5 pascal-seconds.

6. The silicone crumb in accordance with claim 1 in which the silicon-bonded hydrogen containing polysiloxane is a trimethylsiloxy endblocked polymethylhydrogensiloxane.

7. The silicone crumb in accordance with claim 2 in which the silicon-bonded hydrogen-containing polysiloxane is a trimethylsiloxy endblocked polymethylhydrogensiloxane.

8. The silicone crumb in accordance with claim 3 in which the silicon-bonded hydrogen containing polysiloxane is a trimethylsiloxy endblocked polymethylhydrogensiloxane.

9. The silicone crumb in accordance with claim 4 in which the silicon-bonded hydrogen-containing polysiloxane is a trimethylsiloxy endblocked polymethylhydrogensiloxane.

10. The silicone crumb in accordance with claim 5 in which the silicon-bonded hydrogen-containing polysiloxane is a trimethylsiloxy endblocked polymethylhydrogensiloxane.

11. The silicone crumb in accordance with claim 1 further comprising a platinum catalyst inhibitor for inhibiting the hydrosilation reaction at room temperature.

12. The silicone crumb in accordance with claim 2 further comprising a platinum catalyst inhibitor for inhibiting the hydrosilation reaction at room temperature.

13. The silicone crumb in accordance with claim 5 further comprising a platinum catalyst inhibitor for inhibiting the hydrosilation reaction at room temperature.

14. The silicone crumb in accordance with claim 6 further comprising a platinum catalyst inhibitor for inhibiting the hydrosilation reaction at room temperature.

15. The silicone crumb in accordance with claim 10 further comprising a platinum catalyst inhibitor for inhibiting the hydrosilation reaction at room temperature.

16. The silicone crumb in accordance with claim 1 in which the platinum catalyst (C) is a complex made from chloroplatinic acid and a divinylsiloxane.

17. The silicone crumb in accordance with claim 2 in which the platinum catalyst (C) is a complex made from chloroplatinic acid and a divinylsiloxane.

18. The silicone crumb in accordance with claim 5 in which the platinum catalyst (C) is a complex made from chloroplatinic acid and a divinylsiloxane.

19. The silicone crumb in accordance with claim 6 in which the platinum catalyst (C) is a complex made from chloroplatinic acid and a divinylsiloxane.

20. The silicone crumb in accordance with claim 10 in which the platinum catalyst (C) is a complex made from chloroplatinic acid and a divinylsiloxane.

21. The silicone crumb in accordance with claim 15 in which the platinum catalyst (C) is a complex made from chloroplatinic acid and a divinylsiloxane.

22. The silicone crumb in accordance with claim 1 further comprising a filler.

23. The silicone crumb in accordance with claim 2 further comprising a filler.

24. The silicone crumb in accordance with claim 5 further comprising a filler.

25. The silicone crumb in accordance with claim 10 further comprising a filler.

26. The silicone crumb in accordance with claim 15 further comprising a filler.

27. The silicone crumb in accordance with claim 16 further comprising a filler.

28. The silicone crumb in accordance with claim 21 further comprising a filler.

29. The silicone crumb in accordance with claim 1 in which the vinyl-containing polyorganosiloxane of (A) is a triorganosiloxy endblocked polymethylvinylsiloxane having a viscosity at 25° C. of less than 50 pascal-seconds.

30. The silicone crumb in accordance with claim 29 in which the triorganosiloxy of the polymethylvinylsiloxane of (A) is trimethylsiloxy.

31. The silicone crumb in accordance with claim 30 in which the silicon-bonded hydrogen containing polysiloxane is a trimethylsiloxy endblocked polymethylhydrogensiloxane.

32. The silicone crumb in accordance with claim 31 further comprising a platinum catalyst inhibitor for inhibiting the hydrosilation reaction at room temperature.

33. The silicone crumb in accordance with claim 32 in which the platinum catalyst (C) is a complex made from chloroplatinic acid and a divinylsiloxane.

34. The silicone crumb in accordance with claim 33 further comprising a filler.

35. The silicone crumb in accordance with claim 1 in which the extrusion rate is at least 800 grams per minute.

36. The silicone crumb in accordance with claim 4 in which the extrusion rate is at least 800 grams per minute.

37. The silicone crumb in accordance with claim 5 in which the extrusion rate is at least 800 grams per minute.

38. The silicone crumb in accordance with claim 10 in which the extrusion rate is at least 800 grams per minute.

39. The silicone crumb in accordance with claim 15 in which the extrusion rate is at least 800 grams per minute.

40. The silicone crumb in accordance with claim 20 in which the extrusion rate is at least 800 grams per minute.

* * * * *